United States Patent
Anderson et al.

(10) Patent No.: US 8,429,393 B1
(45) Date of Patent: Apr. 23, 2013

(54) METHOD FOR OBSCURING A CONTROL DEVICE'S NETWORK PRESENCE BY DYNAMICALLY CHANGING THE DEVICE'S NETWORK ADDRESSES USING A CRYPTOGRAPHY-BASED PATTERN

(75) Inventors: Mark B. Anderson, Chapel Hill, NC (US); David D. Brandt, Milwaukee, WI (US); Ramadas M. Pai, Racine, WI (US); Taryl J. Jasper, South Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1041 days.

(21) Appl. No.: 10/955,526

(22) Filed: Sep. 30, 2004

(51) Int. Cl.
| | |
|---|---|
| G06F 21/00 | (2006.01) |
| G06F 1/24 | (2006.01) |
| G06F 9/00 | (2006.01) |
| G06F 11/00 | (2006.01) |
| G06F 12/14 | (2006.01) |
| G06F 12/16 | (2006.01) |

(52) U.S. Cl.
USPC .............. 713/100; 713/168; 713/172; 726/2; 726/14; 726/22; 726/23; 380/273; 709/220; 709/221; 709/227; 709/228; 709/229; 709/245

(58) Field of Classification Search ................... 713/100, 713/168, 172; 726/2, 14, 22–23; 709/220, 709/221, 227–229, 245; 380/273
See application file for complete search history.

(56) References Cited

U.S. PATENT DOCUMENTS

| | | | |
|---|---|---|---|
| 5,267,251 A * | 11/1993 | Lenoir et al. ................... | 714/812 |
| 5,537,549 A * | 7/1996 | Gee et al. ....................... | 709/224 |
| 5,548,528 A | 8/1996 | Keeler et al. | |
| 5,991,881 A * | 11/1999 | Conklin et al. .................. | 726/22 |
| 6,243,573 B1 * | 6/2001 | Jacklin ............................ | 455/416 |
| 6,578,074 B1 * | 6/2003 | Bahlmann ...................... | 709/220 |
| 6,757,712 B1 * | 6/2004 | Bastian et al. ................. | 709/206 |
| 6,826,616 B2 * | 11/2004 | Larson et al. .................. | 709/228 |
| 6,839,759 B2 * | 1/2005 | Larson et al. .................. | 709/228 |
| 6,981,146 B1 * | 12/2005 | Sheymov ....................... | 713/172 |
| 7,016,352 B1 * | 3/2006 | Chow et al. .................... | 370/392 |
| 7,075,453 B2 * | 7/2006 | Lee et al. ................... | 340/825.52 |
| 7,114,006 B2 * | 9/2006 | Colvig et al. .................. | 709/245 |
| 7,188,180 B2 * | 3/2007 | Larson et al. .................. | 709/227 |
| 7,568,048 B2 * | 7/2009 | Murakami ...................... | 709/245 |
| 2002/0161884 A1 * | 10/2002 | Munger et al. ................. | 709/224 |
| 2003/0177249 A1 * | 9/2003 | Takanashi et al. ............. | 709/229 |
| 2004/0098485 A1 * | 5/2004 | Larson et al. .................. | 709/227 |
| 2004/0103205 A1 * | 5/2004 | Larson et al. .................. | 709/229 |
| 2004/0107285 A1 * | 6/2004 | Larson et al. .................. | 709/229 |
| 2004/0107286 A1 * | 6/2004 | Larson et al. .................. | 709/229 |

(Continued)

OTHER PUBLICATIONS

InvisiLAN Technology: LAN Protection System, Technology Summary. Invicta Networks, Inc. 2001 5 pages.

Primary Examiner — Edan Orgad
Assistant Examiner — Kari Schmidt
(74) Attorney, Agent, or Firm — Turocy & Watson, LLP; William R. Walbrun; John M. Miller

(57) ABSTRACT

A network security system comprises a first component that generates an address for identifying a communicating device on a network. A second component receives the address generated by the first component and facilitates transitioning from an existent address to the generated address. Such transitioning is effectuated in order to protect the network against attack while providing seamless communications with respect to the communicating device.

25 Claims, 12 Drawing Sheets

U.S. PATENT DOCUMENTS

2004/0162994 A1* 8/2004 Cohen et al. .................. 713/201
2004/0243720 A1* 12/2004 Haumont et al. ............. 709/245
2004/0258005 A1* 12/2004 Kitawaki ...................... 370/254
2005/0010789 A1* 1/2005 Liang ............................ 713/189
2005/0114341 A1* 5/2005 Droms ........................... 707/10

* cited by examiner

METHOD FOR OBSCURING A CONTROL DEVICE'S NETWORK PRESENCE BY DYNAMICALLY CHANGING THE DEVICE'S NETWORK ADDRESSES USING A CRYPTOGRAPHY-BASED PATTERN

TECHNICAL FIELD

The subject invention relates generally to network security, and more particularly to protecting devices and communications in a network environment from attack.

BACKGROUND OF THE INVENTION

Advancements in technology have enabled factory applications to become partially or completely automated. For example, applications that once required workers to put themselves proximate to heavy machinery and other various hazardous conditions can now be completed at a safe distance from such hazards. Further, imperfections associated with human action have been minimized through employment of highly precise machines. Many of these factory devices supply data related to manufacturing to databases that are accessible by system/process/project managers on a factory floor. For instance, sensors can detect a number of times a particular machine has completed an operation within a set amount of time. Further, sensors can deliver data to a processing unit relating to system alarms. Thus, a factory automation system can review collected data and automatically and/or semi-automatically schedule maintenance of a device, replacement of a device, and other various procedures that relate to automating a process.

To enable this automation, consistent and trusted communication networks should be employed to facilitate communications between automation devices on a factory floor, as well as between automation devices and high-level systems. Furthermore, in light of constantly increasing processing capabilities with respect to automation devices and computers (desktop, servers, laptops, PDAs, . . . ) as well as greater available bandwidth, robust data structures can be communicated from an automation device in a first geographic region to an automation device in a disparate geographic region almost instantaneously. Thus, for example, an automation controller utilized for a particular manufacturing process in Detroit can communicate with an automation controller employed for a related manufacturing process in Pittsburgh. These advances in communication have enabled manufacturing to become more efficient and precise, with automation devices facilitating reduction of error and waste as well as enabling greater throughput.

Due to precision typically required in manufacturing settings, as well as safety concerns for humans on a factory floor, it is imperative that communications relating to automation devices and contents stored within memory of automation devices be secure. A series of examples is provided to illustrate hazards that can occur given insufficient security relating to an industrial automation environment. A high-level system can include commands to halt operation of a press upon a factory floor. Such commands can desirably be relayed to the press, and the halting of the press enables a technician to perform maintenance upon the press. If, however, a malicious hacker has obtained access to the commands and altered such commands (thereby enabling the press to operate normally), the technician can be in an extremely perilous situation. In another example, automation controllers (e.g., programmable logic controllers) can communicate with one another to effectuate manufacture of a pharmaceutical product or other ingestible product. If a malicious hacker can locate a particular automation controller and attack such controller, the pharmaceutical product can be compromised. Even if the attack is detected prior to the pharmaceutical reaching the general public, the company that manufactures such pharmaceutical suffers due to wasted time as well as wasted product. While the aforementioned examples relate to an industrial automation setting, these security issues can be associated with virtually any network. For instance, a network utilized by a bank can be subject to attack, thereby altering consumers' finances. For instance, due to a network attack, a bank may be unable to accept a direct deposit. A customer may have written a check in dependency upon such deposit and the check can be cashed, thereby resulting in an overdraw. Even if the bank corrects the problem, the customer is subject to embarrassment of overdrawing an account. In yet another example, an engineer performing one or more tests (or maintenance) on part of a system may inadvertently key in an incorrect address to a device that is not associated with security, and accidentally reprogram such device (rather than reprogramming an intended device). Such inadvertent keying can result in safety and/or quality problems that consequently can cause financial loss, injury, or even death.

Many networks that are associated with the aforementioned security risks utilize protocols that require devices within such network to be associated with a source and destination address. These addresses typically are hard coded and/or are issued to the device by a server when such device connects to the network. Furthermore, particular services that a device hosts or to which a device desires access are generally assigned fixed ports. In particular, common services such as web sites or web pages, sometimes used by devices for configuration purposes, are often accessible on common ports like port 80 so that standard web browsers, that assume port 80, can connect easily. In other words, status information can be served on port 80, thereby enabling a standard browser to connect to a networked device and monitor such device. Further, many common applications make assumptions that a database or application is available at particular ports—accordingly, viruses, worms, and the like can make similar assumptions. Devices desire to utilize a service on a disparate device typically connect to such device to access the service. The connecting device depends upon being able to locate the disparate device at a particular address and port in order to make such connection. Accordingly, when a malicious hacker wishes to cause damage to a network and/or devices within the network, such hacker often monitors the network and obtains address information relating to one or more devices prior to launching an attack. Such reconnaissance on the network can provide the hacker with a list of devices by network address, which ports the devices are serving, applications and services being provided by the device, and other critical information relating to the device. The hacker generally uses this information to plan and execute an attack against a network-connected device. For particular examples, viruses and worms often target networked systems that have services listening on certain well-documented ports.

In view of at least the above, there exists a need in the art for a system and/or methodology that facilitates thwarting hackers that may attempt to launch attacks, viruses, and worms in connection with a networked system.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methodologies for securing a network against attacks (e.g., attacks which desirably effect one or more targeted devices). In particular, the subject invention facilitates thwarting monitoring of a network to determine network device indicia by altering addresses/ports of networked devices. Such alteration is accomplished while communicating devices are connected to a network, wherein the alteration does not substantially effect communications relating to the communicating devices. For example, a networked device (e.g., an automation device, a server, a router, a client . . . ) can be associated with an address that identifies such device on a network. To prevent an individual and/or computer component from monitoring the network based upon static addresses, the subject invention contemplates periodically changing the address of the networked device. Thus, the networked device is associated with a first address, and then in a coordinated manner is seamlessly associated with a second address. Such coordinated, seamless transmission of addresses enables networked devices to continue to communicate without interruption.

In accordance with an aspect of the subject invention, a central authority can be employed to determine which devices should be associated with changing addresses, identities of changing addresses, when such addresses are to be changed, and the like. For instance, it may be desirable to associate devices on an "edge" of the network with changing addresses, while it may not be desirable to change addresses of more "internal" network devices. The central authority can employ a random number generator in connection with generating a new address to be applied to a network device, as well as a time that the networked device is to be associated with the new address. In particular, the central authority can be associated with a range of acceptable addresses, and the random number generator can be configured to generate addresses within such range (while ensuring that no duplicate addresses exist on the network). Similarly, a range of acceptable times of address change can be defined, and the random number generator can be configured to create times of address change within the defined range.

Timing mechanisms are utilized to efficiently alter address(es) of device(s) within a network without effecting communication relating to such devices. For example, a router, switch, or other suitable network device can be associated with a timing mechanism, and other communicating devices within the network can also be associated with timing mechanisms. In accordance with one aspect of the subject invention, the timing mechanisms within the network can be synchronized. Thus, networked devices that utilize an address of a networked device to facilitate communications with such device can alter data packets at a substantially similar time. Specifically, data packets typically include a header that indicates a desired destination of the data, and such destination is often represented by an address or the like. Accordingly, the address in the data packet(s) should be altered at a similar time that an address of the destination device is altered. Similarly, networked devices employ addresses to determine that data is intended for such networked devices. Thus, synchronization of the timing mechanisms is useful in connection with informing networked device(s) of alterations in one or more device addresses. For instance, the timing mechanisms can be synchronized according to Coordinated universal time (UTC). In accordance with a disparate aspect of the subject invention, a "count-down" approach can be employed in connection with informing networked device(s) of a time of change of an address relating to a networked device. For example, a central authority can define a time that an address of a networked device is to change. Thereafter, networked device(s) can begin "counting-down" until such time has expired, and upon such expiration implement the changed address.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
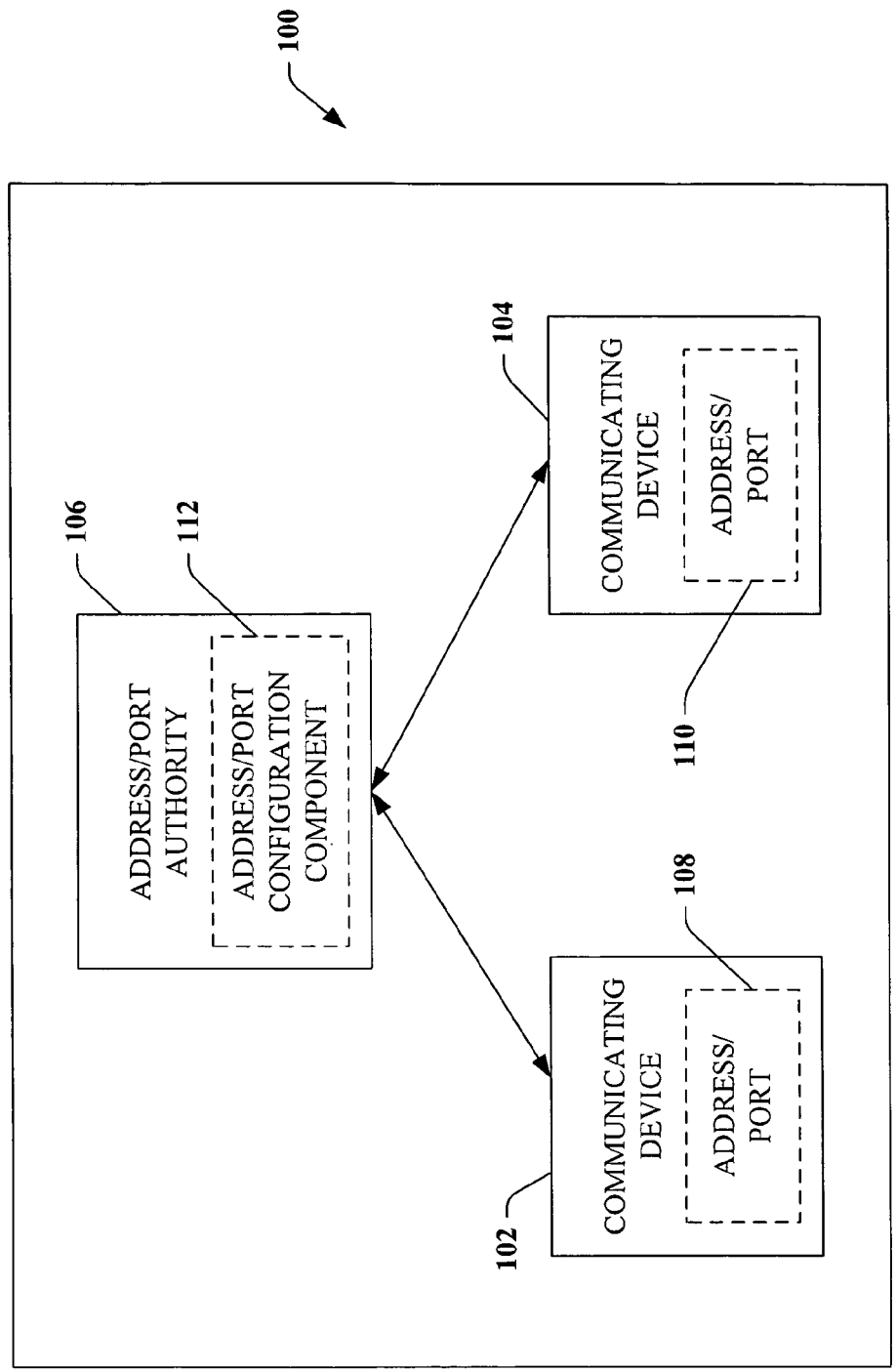
FIG. 1 is a high-level block diagram of a system that facilitates securing a network from a stealth attack in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with an aspect of the subject invention. The subject invention relates to a novel system 100 that facilitates protecting communicating devices in a network. The system 100 includes a first communicating device 102 that is desirably communicating with second communicating device 104. The first communicating device 102 relays a request to communicate with the second communicating device 104 via an address/port authority 106. For example, the address/port authority 106 can be a router, a switch, a server, or any other suitable networking device that facilitates connecting the first communicating device 102 to the second communicating device 104. In particular, the first communicating device 102 can send a request to the address/port authority 106 to connect to the second communicating device 104. The request can include authentication information relating to the communicating device 102 and/or an operator of such communicating device 102. Moreover, the request can include an address/port 108 that is associated with the first communicating device 102 as well as an address/port 110 that is associated with the second communicating device 104. The address/port authority 106 can thereafter validate the communicating devices 102 and 104 as well as the addresses/ports 108 and 110, respectively, and open a channel of communication between the two communicating devices 102 and 104 via their associated addresses/ports 108 and 110. An address, such as an IP address, is a unique number employed by the communicating devices 102 and 104 to refer to each other when delivering information through a network (e.g., the Internet). These addresses allow machines that pass information on behalf of a sender to determine a location to deliver the information, and for a receiving machine to know that it is the intended recipient. Network ports are interfaces for communicating with a computer program over a network, and are typically numbered. A network protocol attaches a port number to data delivered via such protocol, and a receiving machine will utilize such port number to determine a computer program to which the data is to be delivered.

In conventional networking systems, the addresses/ports 108 and 110 remain static while the communicating devices 102 and 104 are connected to the address/port authority 106. The addresses/ports 108 and 110 are not altered until connection to a network is terminated (e.g., the communicating devices 102 and 104 are powered down, the addresses/ports 108 and 110 are manually renewed, . . . ). Thus, in conventional networks, if continued communication is desired, then addresses/ports associated with communicating devices within the network are static. Moreover, in certain circumstances addresses and/or ports are hard-coded into communicating devices, rendering such address/ports static regardless of whether the devices are powered off. A hacker, worm, virus, or the like can thus monitor a network and learn a substantial amount of information about communicating devices by scanning static addresses/ports associated therewith.

The system 100 thwarts these malicious hackers' attacks, worms, viruses, and the like that base their attacks at least in part upon knowledge of addresses/ports of communicating devices within a network. For example, worms generally spread to a new system/device via traveling through a particular port that is associated with running software that includes one or more bugs. This bug is exploited by the worm to propagate itself. The address/port authority 106 includes an address/port configuration component 112 that is employed to alter the addresses/ports 108 and 110 while the communicating devices 102 and 104 are connected and passing data therebetween. The address/port configuration component 112 can employ an algorithm that determines a time that the alteration of the addresses/ports 108 and 110 will occur, as well as which alterations of the addresses/ports 108 and 110 will occur. For example, a range of acceptable addresses/ports can be pre-defined, and an address/port within such range can be randomly and/or pseudo-randomly selected. The address/port configuration component 112 can inform the communicating devices 102 and 104 on the network of such address/port alterations and when such alterations will occur. The addresses/ports 108 and 110 can thus be altered without disrupting communications between the communicating devices 102 and 104. Accordingly, attacks, viruses, worms, and other destructive devices cannot effectively monitor the system 100 to determine addresses/ports of the communicating devices 102 and 104, as the addresses/ports 108 and 110 are constantly changing. In particular, a hacker may scan a system, but due to altering ports and/or addresses, an attack by the hacker can fail because the address/port information obtained is obsolete. It is conceivable that the hacker can employ a protocol analyzer to analyze patents and infer types of conversation(s) being undertaken between devices. It is extremely difficult, however, to trace such conversations in a manner that would allow a hacker to plan an attack, as the altering addresses/ports would cause confusion during trace.

In accordance with one aspect of the subject invention, the communicating device 102 can be a client, the address/port authority 106 can be a router, and the communicating device 104 can be a server. Thus, the router can include technology that enables generation/implementation of altering addresses/ports of the communicating device 102 (e.g., the client) and/or the communicating device 104 (e.g., the server). The client can utilize applications that relate to the server, and such applications will not be interrupted when addresses/ports of the client and/or the server are altered. In a disparate aspect of the subject invention, the communicating device 102 and the communicating device 104 can both be clients within a network, and the address/port authority 106 can be a server and/or a router. Therefore, two clients can interact with one another in a network without being associated with static addresses/ports that are employed to communicate with such devices. From the aforementioned examples, it can be determined that the communication devices 102 and 104 can be any suitable devices (e.g., clients, servers, . . . ), and the address/port authority can be any suitable network device that is employed to enable the communicating devices 102 and 104 to exchange data.

In accordance with another aspect of the subject invention, the system 100 can reside in an industrial automation environment. For example, the communicating devices 102 and 104 can be industrial automation devices, such as programmable logic controllers (PLCs). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 100 as communication devices 102 and 104, it is to be understood that any suitable device that can be utilized in connection with communicating within an industrial automation environment can be employed in connection with the subject invention. For example, any suitable microprocessor, microcontroller, server, desktop, laptop, PDA, etc. can be utilized within the system 100 as one or more of the communicating devices 102 and 104. It is further to be understood that the system 100 can be employed in any suitable networked environment. For instance, the system 100 can be utilized in connection with a network associated with banking, insurance, or any other suitable network.

The protocol employed by the system 100 to facilitate communication between devices can be any suitable protocol that utilizes source and destination addresses/ports to enable data exchange. For instance, the Internet protocol suite (TCP/IP) can be employed in connection with the system 100. TCP/IP is a set of protocols that implement a protocol stack on which the Internet operates, and is named after two protocols within such suite—the Transmission Control Protocol (TCP) and the Internet Protocol (IP). The TCP/IP model includes an application layer, a transport layer, a network layer, and a data link layer. The data link layer defines manners in which data packets are transported over physical devices, such as wires, fiber optic links, radio links, and the like. Examples of data link layer protocols include Ethernet, Wireless Ethernet, SLIP, Token Ring, 802.11 WiFi, ATM, etc. The network layer is utilized to transfer packets across a network and/or multiple networks. In particular, IP is employed to facilitate transfer of data packets from a source to a destination. Other protocols can be operated in connection with IP to facilitate optimal data transfer between devices/networks. The transport layer of TCP/IP is employed to monitor/ensure reliability of data transfer. For instance, the transport layer utilizes protocols that ensure that data is arriving to a device in a correct order, and can determine which application/device any given data is intended to reach. TCP resides within this layer, and is a connection-oriented transport mechanism providing a reliable byte stream, ensuring that data arrives to a desired destination undamaged and in a proper order. The application layer includes network programs that are fairly common. For instance, HTTP, FTP, DHCS, and other suitable protocols can reside in this layer. While the above describes a set of protocols utilized in the TCP/IP protocol suite, any suitable networking models/protocols that utilize source and destination addresses to facilitate communication between devices/applications can be utilized in connection with the subject invention. In particular, the address/port authority 106 of the subject invention can alter addresses/ports within the system 100 to thwart hackers and the like while maintaining communications between devices/applications.

Figure 2:
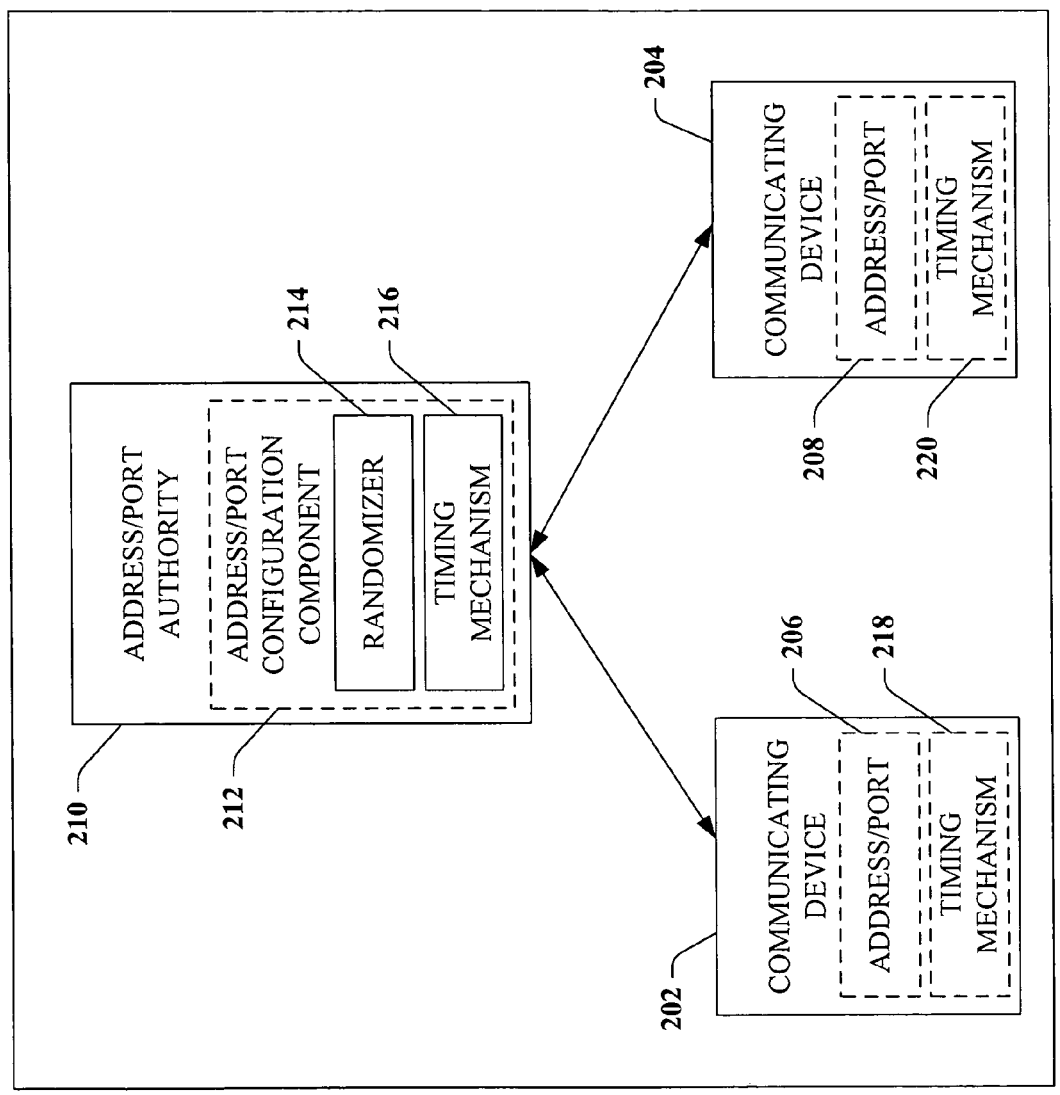
FIG. 2 is a block diagram of a system that facilitates implementing a changed address according to a generated time in accordance with an aspect of the subject invention.

Turning now to FIG. 2, a system 200 that facilitates maintaining security of a network is illustrated. The system 200 includes a first communicating device 202 that desirably delivers and/or exchanges data with a second communicating device 204. The communicating devices 202 and 204 are associated with addresses/ports 206 and 208, which are utilized to identify the communicating devices 202 and 204, respectively, and programs/applications therein. For instance, the address/port 206 can be utilized by the communicating device 202 to identify such communicating device 202 and/or program therein for delivery and receipt of data. The addresses/ports 206 and 208 associated with the communicating devices 202 and 204 can be assigned by an address/port authority 210. In accordance with the subject invention, the addresses/ports 208 can be regularly altered by the address/port authority 210 to prevent a malicious hacker from monitoring the addresses/ports 206 and 208 to determine indicia relating to the communicating devices 202 and 204, where such alteration does not interrupt data exchanges between the communicating devices 202 and 204.

The address/port authority 210 includes an address/port configuration component 212 that is utilized to alter the addresses/ports 206 and 208 of the communicating devices 202 and 204. The address/port configuration component 212 can, for example, have access to a range of addresses that can be recognized on a network that facilitates communication between devices, and can generate address/port numbers within such range. For example, the address/port configuration component 212 can include a randomizer 214 that is employed to randomly alter the addresses/ports 206 and 208 within the aforementioned range of address ports. For instance, the randomizer 214 can include a random number generator to create random and/or pseudorandom addresses/ports to be applied to the communicating devices 202 and 204. The randomizer 214 can be a computational device that is designed to generate a sequence of numbers that cannot be easily discernable. For instance, an algorithm can be employed that randomly and/or pseudo-randomly alternates the addresses/ports 206 and 208 within an acceptable range.

The address/port configuration component 212 can also include a timing mechanism 216 that is employed to determine a time that the addresses/ports 206 and 208 will be modified. This timing information can then be delivered to the communicating devices 202 and 204, therefore enabling the communicating devices 202 and 204 to obtain knowledge of when their address/port numbers are changing. Accordingly, upon receipt of such knowledge, the communicating devices 202 and 204 can recognize instances that data is desirably delivered to such communicating devices 202 and 204, and can further attach their address/port information to outgoing data to enable disparate communicating devices to determine whether the communicating devices 202 and 204 are trusted within a network. The communicating devices 202 and 204 are also associated with timing mechanisms 218 and 220, respectively, thereby allowing such communicating devices 202 and 204 to be aware of a time that their respective addresses/ports 206 and 208 are to alter.

In accordance with one aspect of the subject invention, the timing mechanisms 216-220 can be synchronized with one another. Thus, the address/port authority 210 can generate a time that the addresses/ports 206-208 of the communicating devices 202 and 204 are going to change via the timing mechanism. As the timing mechanisms 218 and 220 are synchronized with the timing mechanism 216, the communicating devices 202 and 204 can determine a precise time in which to alter the addresses/ports 206 and 208. Such precisions allows data exchanges to continue uninterrupted in presence of changing of addresses/ports 206 and 208. One exemplary timing standard that can be employed in connection with the synchronizing the timing mechanisms 216-220 is Coordinated Universal Time (UTC). Utilization of this time standard can be beneficial due to its independence with respect to geographic zones (e.g., time zones around the world are simply offsets from UTC). Any suitable timing standard and method/system for synchronizing clocking mechanisms of communicating devices, however, is contemplated by the subject invention and intended to fall under the scope of the hereto-appended claims.

In accordance with another aspect of the subject invention, the timing mechanisms 216-220 can utilize a "count down" approach in connection with determining a time to alter the addresses/ports 206 and 208. For example, the timing mechanism 216 can inform the communicating device 202 that the address/port 206 will be altered in a time X. The timing mechanism 218 can subsequently be set to time X and begin counting down until time X has expired, and upon expiration the address/port 206 is changed. It is further to be understood that the addresses/ports 206 and 208 can be altered at disparate times. For instance, the address/port 206 can be altered at a first (random) time and the address/port 208 can be altered at a second (random) time. Thus, a malicious hacker is unable to monitor the system 200 to determine times that the addresses/ports 206 are altered, and consequently cannot obtain information relating to the communicating devices 202 and 204 and/or the address/port authority 210.

Figure 3:
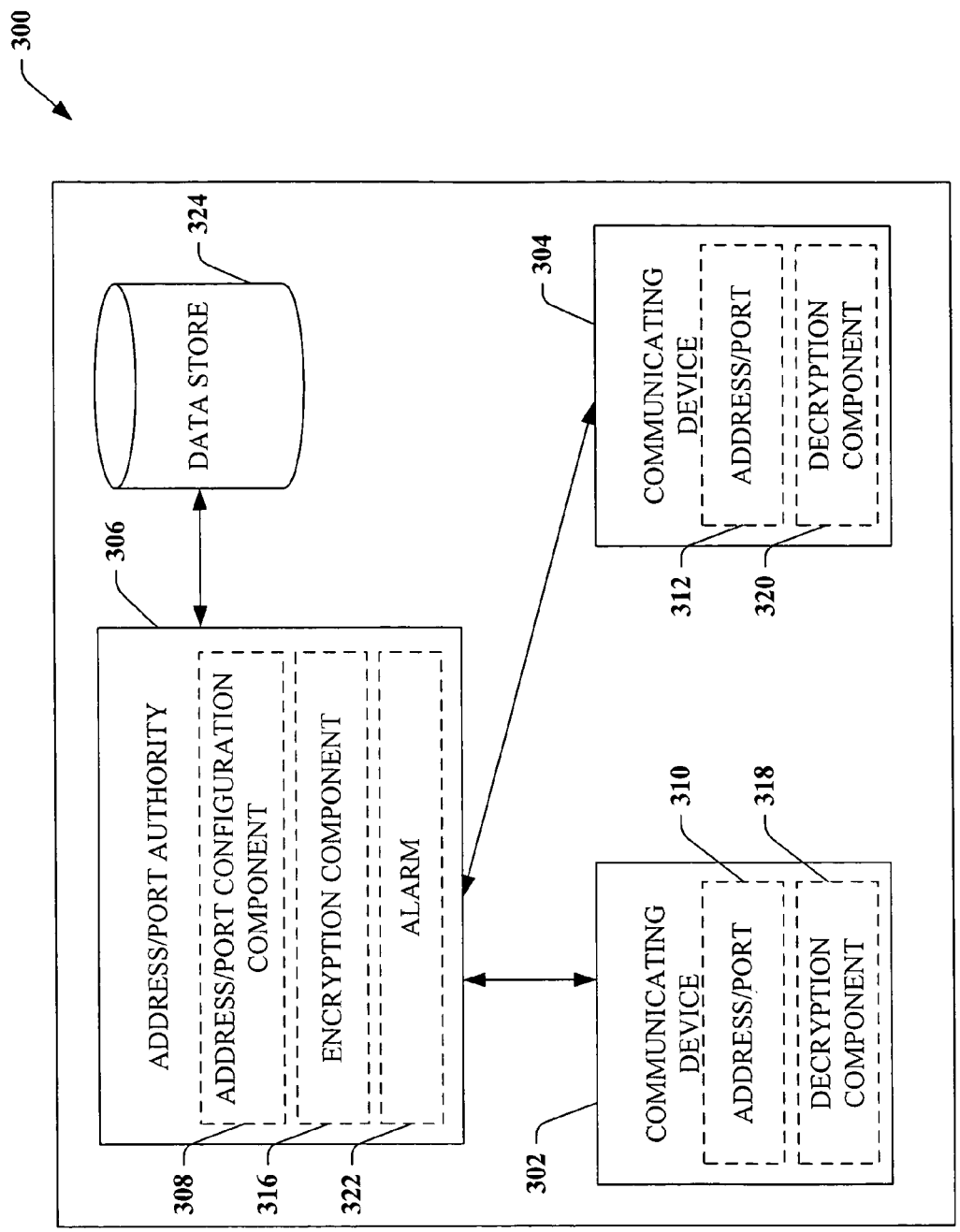
FIG. 3 is a block diagram of a system that facilitates encrypting address/port information relating to one or more network devices in accordance with an aspect of the subject invention.

Now referring to FIG. 3, a network communications security system 300 is illustrated. The system 300 includes a communicating device 302 that is exchanging data with a communicating device 304 via an address/port authority 306. For example, the address/port authority 306 can be a router, a switch, a server, or any suitable combination thereof. More particularly, the address/port authority 306 can include a server that generates addresses/ports that are to be utilized in connection with the communicating devices 302 and 304. The server can communicate such information to a router, which stores such information and delivers the information to the communicating devices 302 and 304. The communicating devices 302 and 304 are within a network that employs source and destination addresses/ports to exchange/deliver/receive data, and accordingly employ addresses/ports 310 and 312 to facilitate such exchange/delivery/reception of data. Numbers utilized in the addresses/ports 310-312 can be generated by the address/port configuration component 308 and assigned to the communicating devices 302 and 304. Such assignment should enable seamless communication between the communicating devices 302 and 304 via the address/port authority 306.

The address/port authority 306 can employ an encryption component 314 in connection with delivering address/port information to the communicating devices 302 and 304. For instance, the address/port authority 306 and the communicating device 302 can employ Pretty Good Privacy (PGP) to deliver/receive address/port information. PGP is a program that provides cryptographic privacy and authentication, and is capable of a high level of security. Thus, PGP can be employed by an encryption component 316 within the address/port authority 306 to encrypt address/port information that is to be delivered to the communicating devices 302 and 304. Further, PGP can be employed in connection with protecting data exchanged between the communicating devices 302 and 304 as well as data received/delivered by the address/port authority 306. The communicating devices 302 and 304 can include decryption components 318 and 320, respectively, that are employed to decrypt encrypted messages. For instance, address/port information can be generated by the address/port configuration component 308 and commissioned with keys. The decryption components 318 and 320 can have possession of such keys, wherein the keys enable the decryption components 318 and 320 to decrypt the address/port information. Thereafter, such address/port information can be utilized within the communicating devices 302 and 304 to alter the addresses/ports 310 and 312.

As the system 300 is protected against hackers, viruses, worms, and the like that target devices via addresses/ports, attacks upon the system 300 may be in a form of a blaster. An alarm 322 can be provided within the address/port authority 306 that detects such blaster attacks and other network attacks. While the alarm 322 is shown as being part of the address/port authority 306, it is to be understood that the alarm 322 can exist within any suitable networking device (e.g., the communicating devices 302 and 304). Such alarm can inform an operator of a blaster attack or the like, or can automatically take steps that prevent such attack from damaging a network. It is possible that the alarm 322 cannot determine a blasting attack, as some packet blasts are directed at specific addresses. Similarly, blaster attacks can flood a network and make it substantially difficult for the alarm 322 to deliver a message to a user and/or other components. Thus, the alarm 322 encompasses firewalls that rely on sophisticated logging to avoid the above problems, wherein operators can review the or employ software to scan the logs. A data store 324 is provided to maintain data relating to the system 300. For instance, the data store 324 can store address/port information to ensure that repeating address/port numbers are not assigned to a communicating device.

Figure 4:
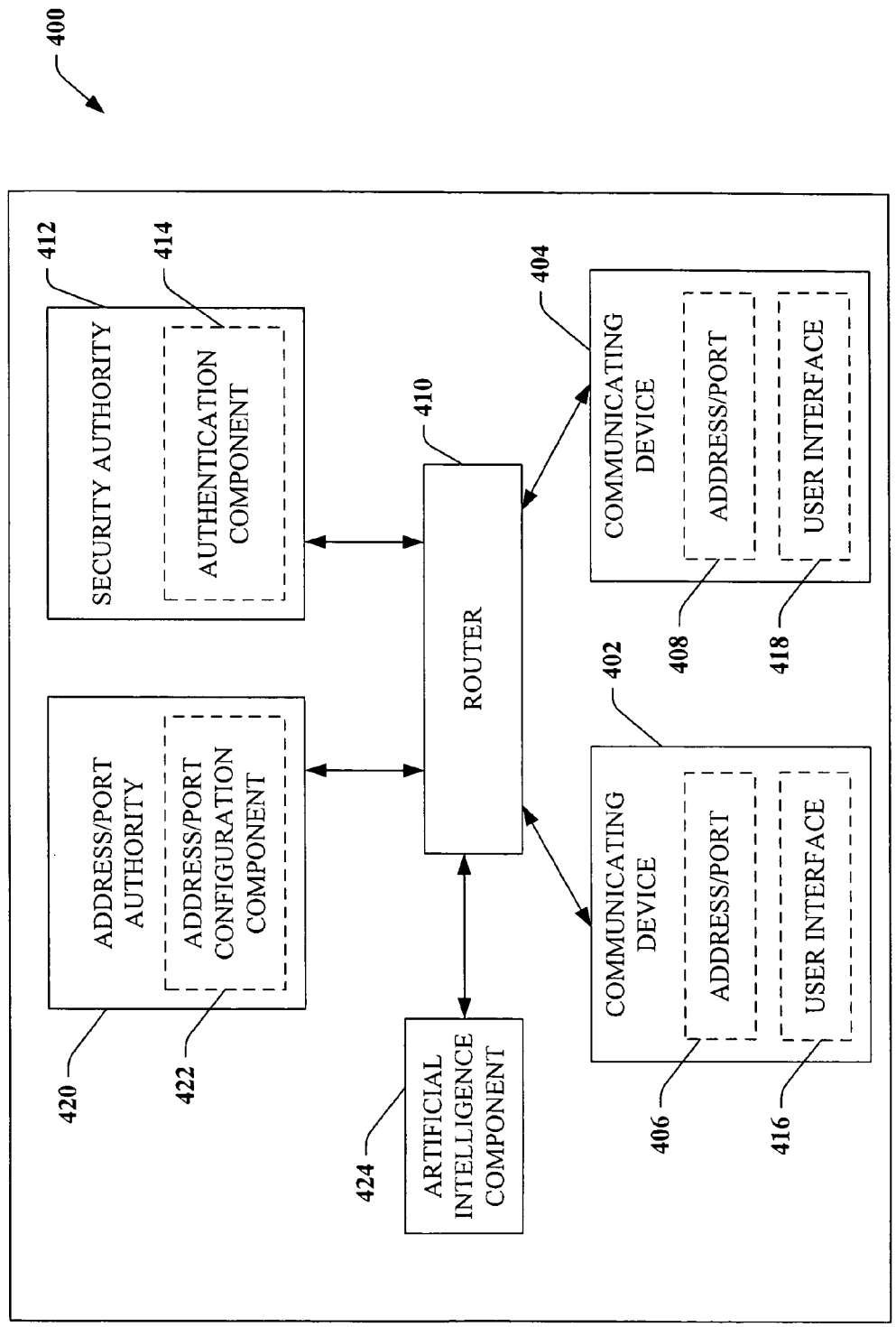
FIG. 4 is block diagram of a system that facilitates altering addresses/ports of devices in a network without substantially effecting communications in such network in accordance with an aspect of the subject invention.

Now turning to FIG. 4, a system 400 that facilitates securing a network is illustrated. The system 400 includes communicating devices 402 and 404 that desirably exchange data with one another. For example, at least one of the communicating devices 402 and 404 can be a desktop computer, a laptop, a PDA, a cellular phone, a client, a server, or any other suitable device that can receive and/or deliver data. The communicating devices 402 and 404 can be within a network that employs source and destination address data to enable communications between the communicating devices 402 and 404. Accordingly, the communicating devices 402 and 404 are associated with addresses/ports 406 and 408, respectively. These addresses/ports 406 and 408 include numbers that uniquely identify the communicating devices 402 and 404 within a network, and can further identify applications running on such communicating devices 402 and 406.

The system 400 further includes a router 410 that provides a mechanism for connecting the communicating device 402 with the communicating device 404. Routers are computer-networking devices that are employed to forward data packet to requested destinations. For example, the communicating device 402 can request to exchange data with the communicating device 404. The router 410 receives the request, and communicates with a security authority 412 to verify that the automation device 402 is authorized to access the communicating device 404. In particular, the security authority 412 can include an authentication component 414 that analyzes identifying indicia provided by the communicating device 402 and/or a user thereof. For instance, the communication device 402 can include a user interface 416 that enables a user to provide identifying indicia to the authentication component 414. For instance, the user interface 416 can be one or more of a keyboard, a monitor, a pressure-sensitive screen and/or other pressure sensitive mechanism, a mouse, a microphone, and the like. Thus, a user can enter a username, password, personal identification number (PIN), biometric indicia (fingerprint, voice sample, . . . ), and any other suitable identifying indicia, wherein such indicia is analyzed and verified by the authentication component. If such communicating device 402 is authorized to be on the network and exchange data with the communicating device 404, then the router 410 can connect the communication devices 402 and 404 to one another via their addresses/ports 406 and 408. In accordance with one aspect of the subject invention, the communicating device 404 and/or a user thereof can be authenticated by the security authority 412 in a similar manner as described with respect to the communicating device 402. For instance, the communicating device can include a user interface 418, wherein identifying indicia is entered via such user interface 418.

The system 400 further includes an address/port authority 420 that is employed to alter the addresses/ports 406 and 408, thereby thwarting malicious hackers that perform reconnaissance prior to generating an attack (e.g., worms, viruses . . . ) on particular devices. For instance, the address/port authority 420 can be a server or other suitable device that can manage a plurality of other communicating devices, and includes an address/port configuration component 422. The addresses/ports 406 and 408 can be altered (simultaneously or otherwise) during communications without causing interruption in data exchange between the communicating devices 402 and 404. For example, the address/port authority 420 can deliver address/port information generated by the address/port configuration component 422 to the communicating devices 402 and 404 via the router 410. This address/port information can thereafter be employed by the communicating devices 402 and 404, thereby enabling alteration of the addresses/ports 406 and 408 associated therewith.

The router 410 can operate in connection with an artificial intelligence component 424, which assists the router in providing connections between the communicating devices. In particular, the artificial intelligence component 424 can make inferences relating generally to the system 400 in connection with enabling seamless data exchange between the communicating devices 402 and 404. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For example, the artificial intelligence component 424 can watch the router 410 and learn data traffic patterns that occur over time. For example, traffic through the router may be greatest at particular points in time during a day, causing delays in some communications. The artificial intelligence component 424 can learn such patterns and make inferences relating to timing of data exchange and other important decisions relating to enabling seamless data exchange between the communicating devices 402 and 404 given a change in address/port of either of such devices 402 and 404 during communications.

Figure 5:
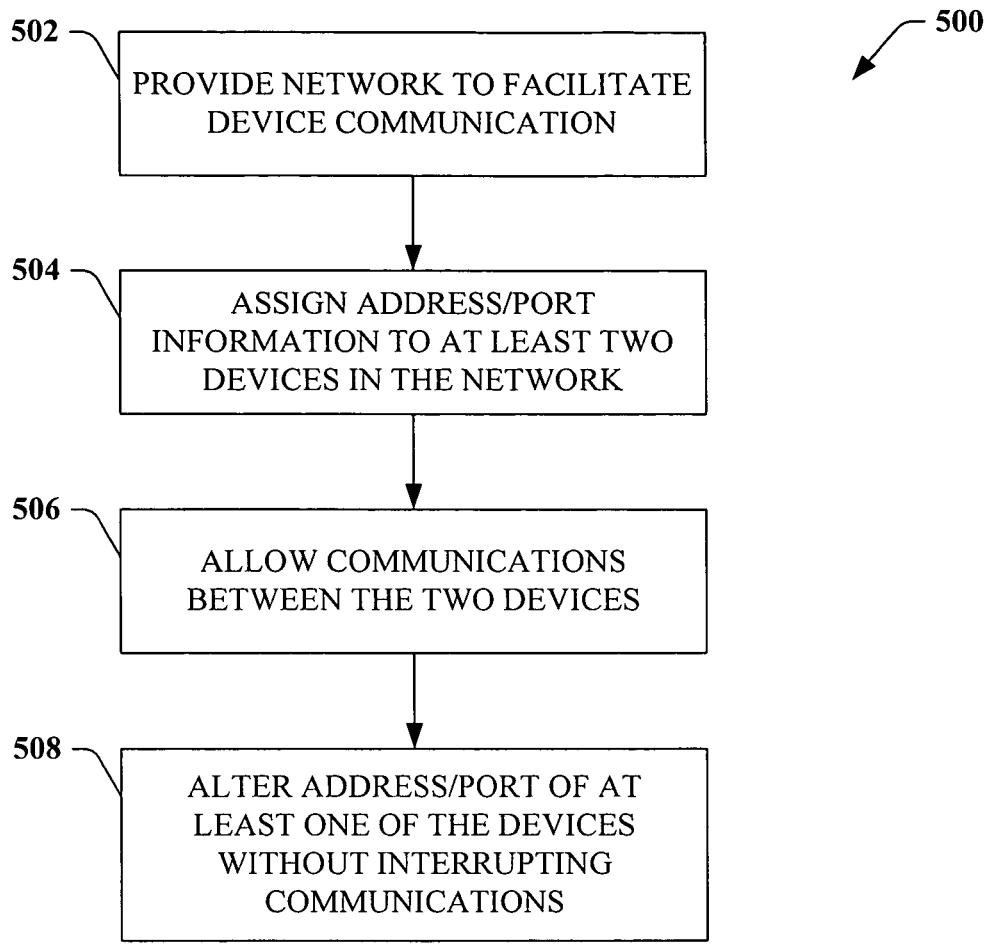
FIG. 5 is a representative flow diagram illustrating a methodology for altering addresses/ports with respect to networked devices in accordance with an aspect of the subject invention.

Turning now to FIG. 5, a methodology 500 for providing security to a network is illustrated. While, for purposes of simplicity of explanation, the methodology 500 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, a network that facilitates exchange of data between devices is provided. For instance, the network can be utilized by desktop computers, cellular phones, PDAs, laptop computers, clients, servers, routers, switches, and any other suitable device that can be employed in connection with exchange of data between communicating devices. The network can utilize a protocol that employs source and destination addresses to verify devices and to ensure that data is being delivered to a correct device. For instance, TCP/IP, UDP, and any other suitable networking protocol that employs source and destination addresses in connection with exchanging data is contemplated by the subject invention and intended to fall under the scope of the hereto-appended claims. Further, these addresses can be utilized by a device for identification purposes (e.g., a device is aware of an address associated therewith, and thus knows which data is desirably received by such device).

At 504, address/port information is assigned to at least two devices within the network, thereby enabling the two devices to communicate with one another. The address/port information can include characters (numbers and/or letters) that are employed to identify devices on the network and/or programs associated with the devices. The included characters can thereafter map to disparate strings to enable a user to quickly and easily locate a desirable device on a network. For instance, domain names (e.g., www.domain.com) map to a series of numbers that are employed at least partly to identify a server that houses information relating to the domain.

At 506, communication between the at least two devices is enabled. For instance, using address and/or port information, a first device can desirably direct data to and/or receive data from a second device. Various authentication techniques can be employed to determine whether communication should be enabled between such two devices. Upon being authorized to communicate, a router, switch, or the like can be employed to establish a connection between the two devices. Thereafter, data can be passed over such connection. At 508, the address/port of at least one of the communicating devices is altered without interrupting communications. In particular, disparate address/port information can be delivered to one or both communicating devices, as well as any middleware that exists therebetween. Thus, communicating devices with the assigned address can be located by middleware (e.g., a router, switch . . . ), and communicating devices can recognize data that is being delivered to them, as well as recognize an originator of data. Timing mechanisms can be employed to enable seamless communication between the at least two communicating devices.

Figure 6:
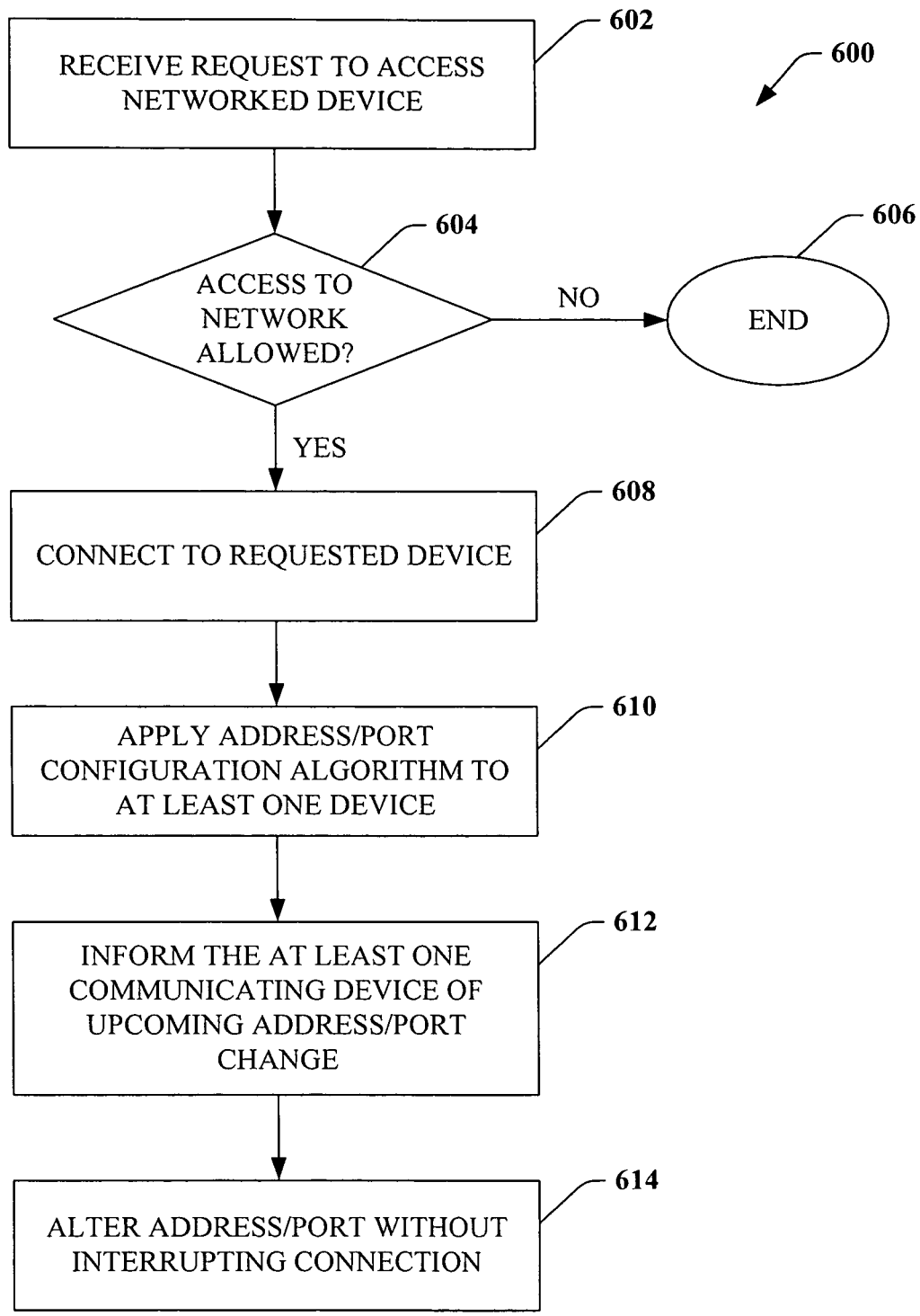
FIG. 6 is a representative flow diagram illustrating a methodology for securing a network against viruses, worms, and the like in accordance with an aspect of the subject invention.

Now turning to FIG. 6, a methodology 600 that facilitates securing communicating devices against stealth attacks is illustrated. At 602, a request to access a networked device is received. For instance, a router, switch, or the like can receive a request to access a communicating device. The router, switch, etc. can relay such request to a server or other device that is associated with a security authority. For example, the request can be associated with authenticating indicia that is analyzed prior to enabling access to networked devices. At 604, a determination is made regarding whether access to the network is allowed based at least in part upon an initiator of the access request. If access is denied, the methodology 600 ends at 606. If access is allowed, then the communicating device that initiated the request is connected to the desirable device at 608. For instance, a router, switch, or the like can facilitate connecting the aforementioned communicating devices based at least in part upon addresses/ports associated with such communicating devices.

At 610, an address/port configuration algorithm is applied to at least one of the communicating devices. This algorithm can employ a random/pseudo-random number generator in connection with providing the at least one communicating device with a disparate address. For example, the random/pseudo-random number generator can generate address/port numbers within a particular range in a random/pseudorandom fashion. Moreover, the configuration algorithm can employ a timing mechanism that is employed to inform one or more devices on the network of timing of address/port alterations. At 612, at least one communicating device is informed of an upcoming address/port change. For instance, a first communicating device can be exchanging data with a second communicating device via a router, and the address of the first communicating device is desirably altered. The first communicating device can be informed of the upcoming alteration, including a time to alter an address associated with such first communicating device. Thus, an address can be changed at a particular time and the first communicating device can be aware of the address change. Furthermore, a router, switch, or other communication-enabling device can be informed of the address change and timing related thereto. Thus, if the router receives a request for a particular address, it will recognize such address and provide a connection accordingly. Moreover, other communicating devices on a network can be informed of an address change of the first communicating device, thus allowing the other devices to identify the device for requesting data and/or receiving data. At 614, the address/port is altered without interrupting connection between two disparate devices.

Figure 7:
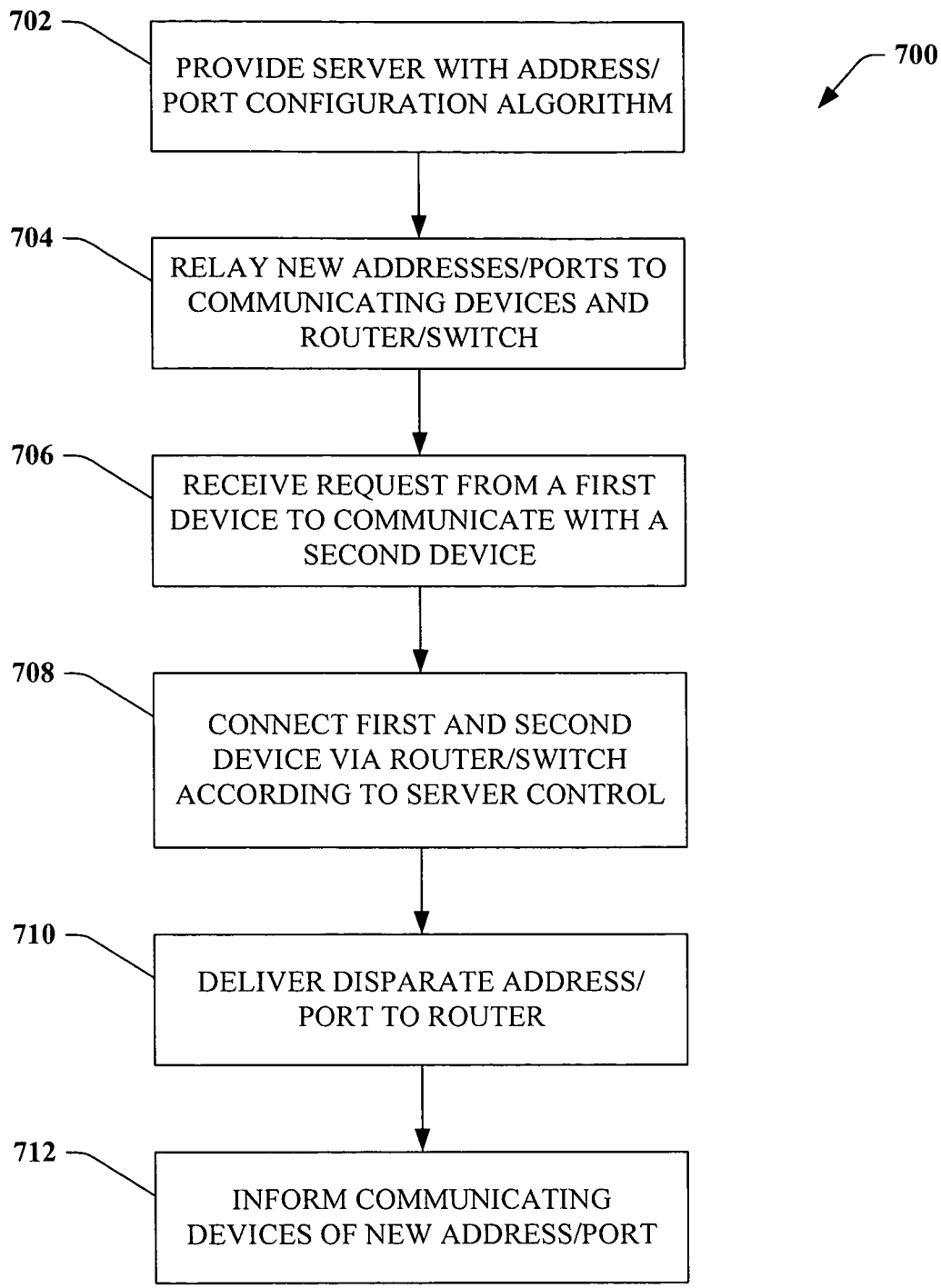
FIG. 7 is a representative flow diagram illustrating a methodology for changing network addresses of at least two networked devices without substantially effecting communications therebetween in accordance with an aspect of the subject invention.

Referring now to FIG. 7, a methodology 700 that facilitates securing communicating devices within a network from attack is illustrated. At 702, a server is provided with an address/port configuration algorithm. As described above, this algorithm can randomly/pseudo-randomly generate addresses/ports within specified ranges, wherein such addresses/ports are to be applied to communicating devices within the network. Furthermore, the server can alter addresses/ports relating to itself via employing the address/port configuration algorithm. In accordance with one aspect of the subject invention, the address/port configuration algorithm can be utilized to further provide a time that devices on a network are to alter their addresses/ports. At 704, the addresses/ports generated by the address/port configuration algorithm are related to one or more communicating devices on a network as well as a router/switch that is utilized to connect two or more communicating devices in the network.

At 706, a request from a first device on the network to communicate with a second device on the network is received. Such request, for example, can be received by a router that is associated with a component, wherein the component can authenticate the first device and the second device (e.g., usernames, passwords, PINs, and the like can be analyzed). At 708, the first device and the second device are connected via a router/switch according to the addresses/ports generated by the address/port configuration algorithm. At 710, the configuration algorithm is employed to deliver information relating to a disparate address/port to the router. For instance, such information can include instructions to alter an address/port associated with a communicating device within the network, wherein the instructions include identification of a new address/port and a time to implement the new address/port. At 712, the router relays such information to communicating devices on the network. The router can further store such address/port information to enable the router to properly connect communicating devices without causing interruption in data exchange therebetween.

Figure 8:
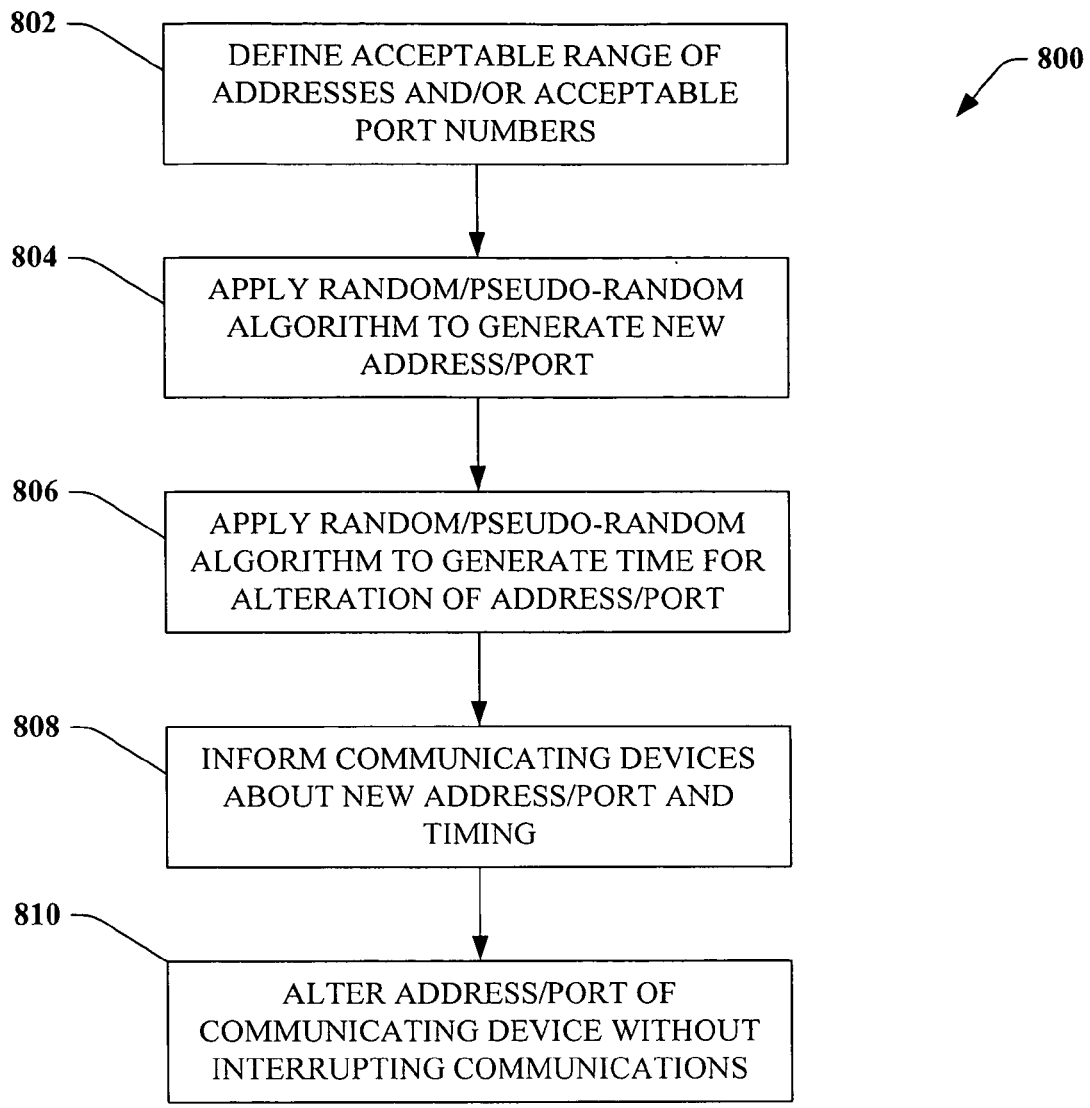
FIG. 8 is a representative flow diagram illustrating a methodology for informing networked devices of an upcoming address alteration in accordance with an aspect of the subject invention.

Now turning to FIG. 8, a methodology 800 for providing communicating devices in a network with altering addresses/ports without disrupting communications is illustrated. At 802, an acceptable range of addresses and/or an acceptable range of port numbers is defined. Often, addresses, such as IP addresses, are provided in a block of acceptable addresses. Similarly, ports employed to access programs may be confined by an acceptable range. At 804, a random and/or pseudo-random algorithm is applied in order to generate new addresses/ports for devices within the network. Such addresses/ports can be delivered to devices on the network at a substantially similar time, or in a disparate aspect of the subject invention, the addresses of communicating devices can be updated at disparate random/pseudorandom times. Such new addresses/ports can be generated in accordance with the defined range of acceptable addresses/ports.

At 806, the random/pseudo-random algorithm is applied to generate a time in which to alter one or more addresses/ports associated with one or more communicating devices within the network. Thus, a malicious hacker monitoring the network will be unable to determine a timing pattern, and thus stealth attacks (worms, viruses) will be further thwarted. At 808, at least one communicating device within the network is informed about the new address/port, as well as informed about timing relating to implementation thereof. For instance, a router can be informed of a changing address/port, as well as communicating devices associated with such changing address/port. Thus, these devices are privy to the address/port change and timing of such change. At 810, an address/port of a communicating device is altered, wherein such alteration does not interrupt communications relating to such device. For instance, if an address/port of a communicating device is altered during exchange of data with a disparate device, such data exchange is not interrupted. Thus, communicating devices within a network can seamlessly communicate during changing of an address/port.

Figure 9:
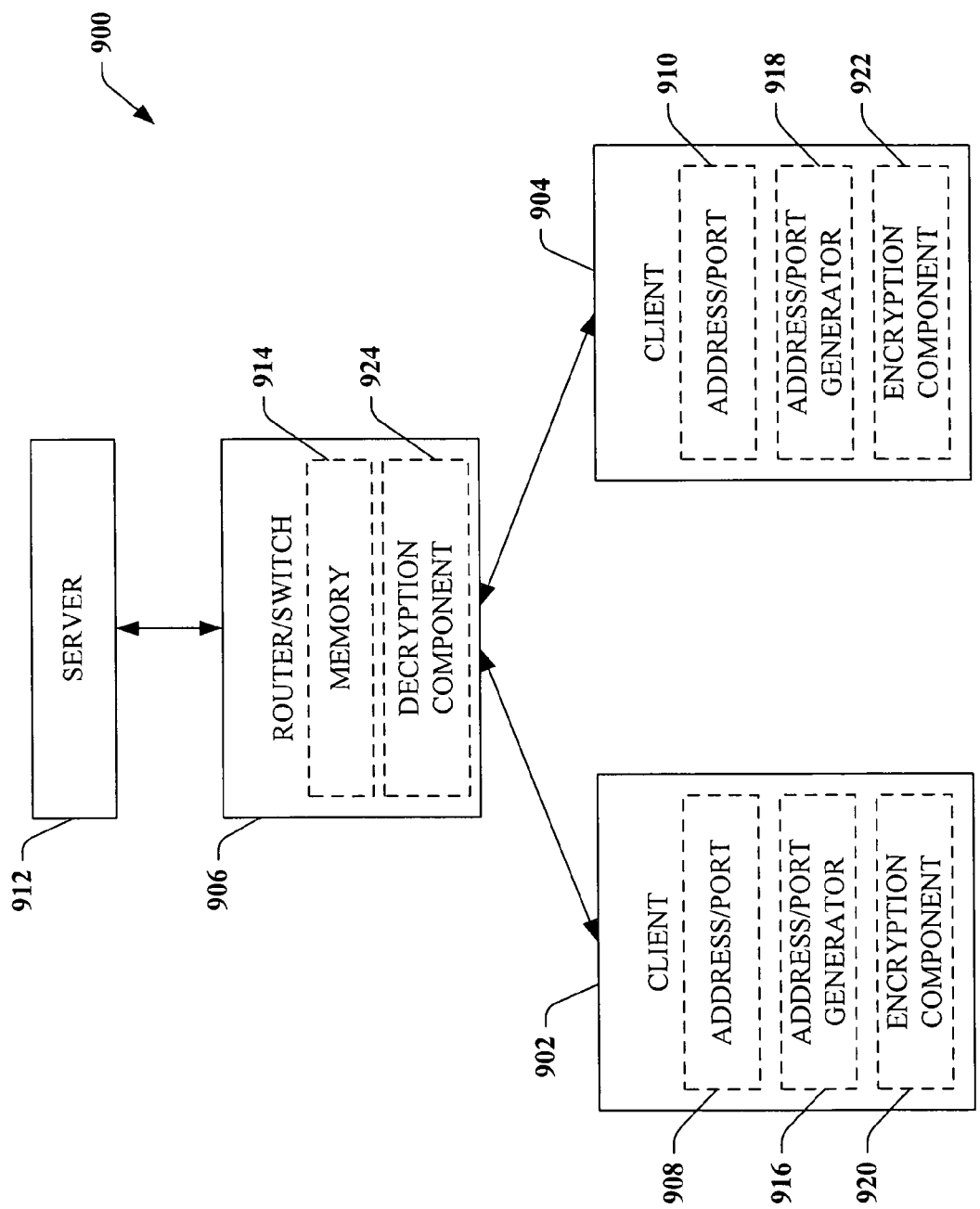
FIG. 9 is an exemplary system that can utilize one or more aspects of the subject invention.

Turning now to FIG. 9, an exemplary system 900 that operates in accordance with an aspect of the subject invention is illustrated. The system 900 includes a first client 902 that is desirably communicating with a second client 904. The clients 902 and 904 exchange data via a router/switch 906, wherein such router/switch 906 has knowledge of addresses/ports 908 and 910 associated with the clients 902 and 904. For instance, the client 902 can request data from the client 904 via the router/switch 906, wherein the clients 902 and 904 and programs therein are identified by the addresses/ports 908 and 910. Prior to enabling a connection between the clients 902 and 904, the router/switch 906 can relay at least a portion of the data request to a server 912 that is employed to verify that the clients 902 and 904 are authorized to communicate. In a disparate aspect of the subject invention, the router/switch 906 can include memory 914 that comprises authentication information. More particularly, the clients 902 and 904 can be authenticated without aid of the server 912.

Upon authenticating the clients 902 and 904, the router/switch 906 opens a connection between such clients 902 and 904 according to their addresses/ports 908 and 910. More specifically, data packets exchanged between the clients 902 and 904 include address information, and such data packets are delivered to the desired client via the router/switch 906. To facilitate thwarting attacks from a virus, worm, and the like, the clients 902 and 904 include address/port generators 916 and 918. Such address/port generators 916 and 918 are employed to alter the addresses/ports 908 and 910 of the respective clients 902 and 904. In particular, the address/port generator 916 can generate a disparate address/port that is to be implemented as the address/port 908 of the client 902. The address/port generators 916 and 918 can further generate times when generated addresses/ports are to be implemented as the addresses/ports 908 and 910 of the clients 902 and 904. While the exemplary system 900 utilizes the address/port generators 916 and 918 in the clients 902 and 904, it is to be understood that an address/port generator can be employed within the server 912 as a central authority.

The clients 902 and 904 further include encryption components 920 and 922, which are employed to encrypt address/port information created by the address/port generators 916 and 918. Such encryption can be employed to protect the clients 902 and 904 from attack, as a hacker cannot easily obtain the address/port information while in transit. The router/switch 906 receives the encrypted address/port information, and can employ a decryption component 924 to decrypt such information. In accordance with another aspect of the subject invention, the router/switch 906 can relay such encrypted address/port information to the server 912, which can thereafter decrypt the information and provide it to the router/switch 906. The address/port information decrypted by the decryption component 924 can be stored in the memory 914 of the router/switch 906. Thus, the router/switch 906 can relay data according to the addresses/ports 908 and 910, even in instances that such addresses/ports 908 and 910 have been altered.

Figure 10:
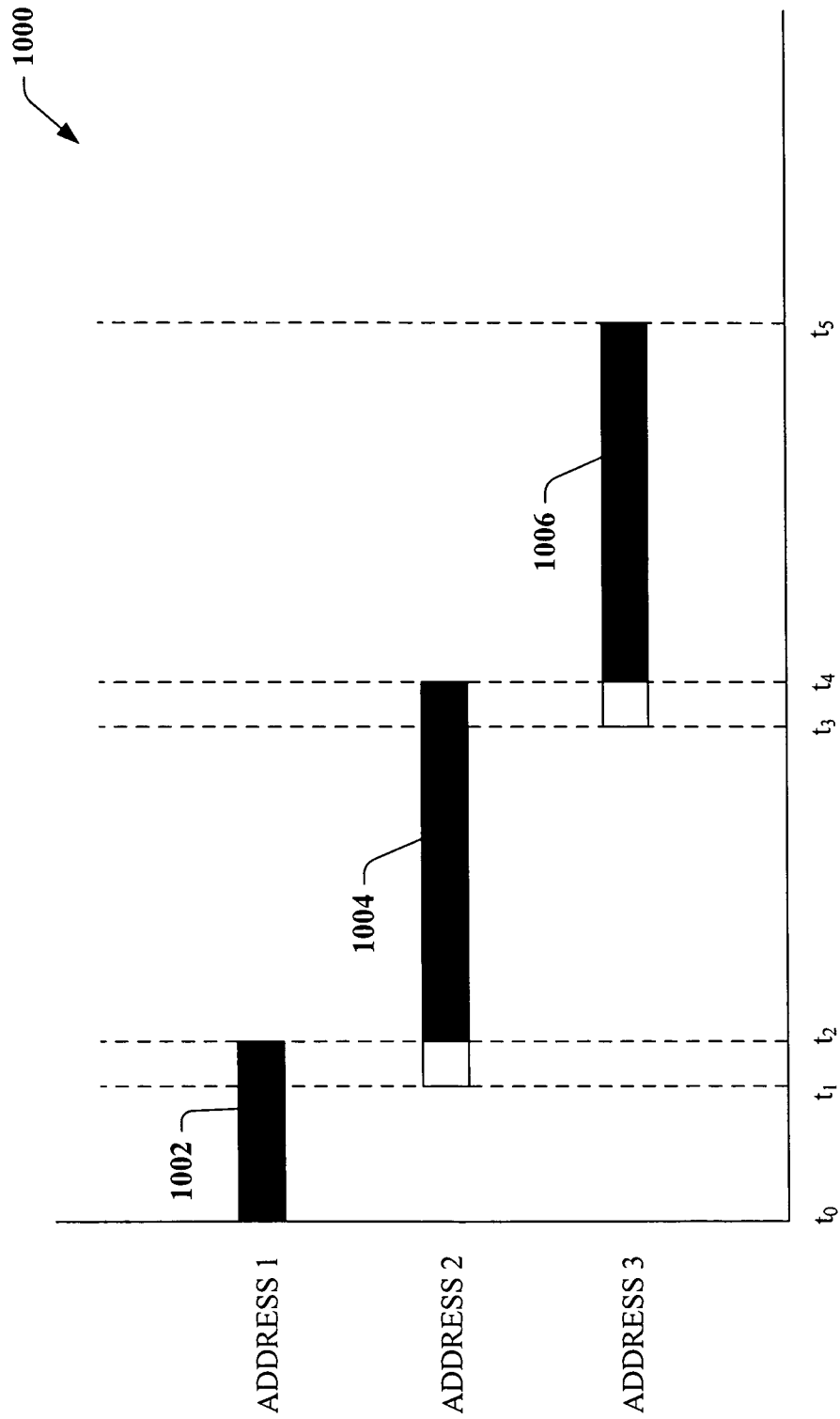
FIG. 10 is an exemplary timing diagram in accordance in accordance with an aspect of the subject invention.

Turning now to FIG. 10, an exemplary timing diagram 1000 of a communicating device's address during communication is illustrated. At time $t_0$, a communicating device is associated with a first address 1002, which is utilized to identify the communicating device in connection with sending and/or receiving data. At time $t_1$, a disparate address 1004 to be implemented within the communicating device at time $t_2$ is created and subsequently relayed to the communicating device. In particular, the communicating device will be provided with instructions to alter, addresses at time $t_2$. At time $t_2$, the communicating device implements the second address 1004, and is accordingly identified by such address 1004. At time $t_3$, a third address 1006 is generated and relayed to the communicating device. The communicating device is provided with instructions to change its address from the second address 1004 to the third address 1006 at time $t_4$. Thereafter, the communicating device is identified by the third address 1006 until communication is ended at time $t_5$. As shown in the timing diagram 1000, addresses of the communicating device can be altered during communications without interrupting such communications, thereby thwarting malicious hackers and the like that attempt to locate and attack particular devices within a network.

Figure 11:
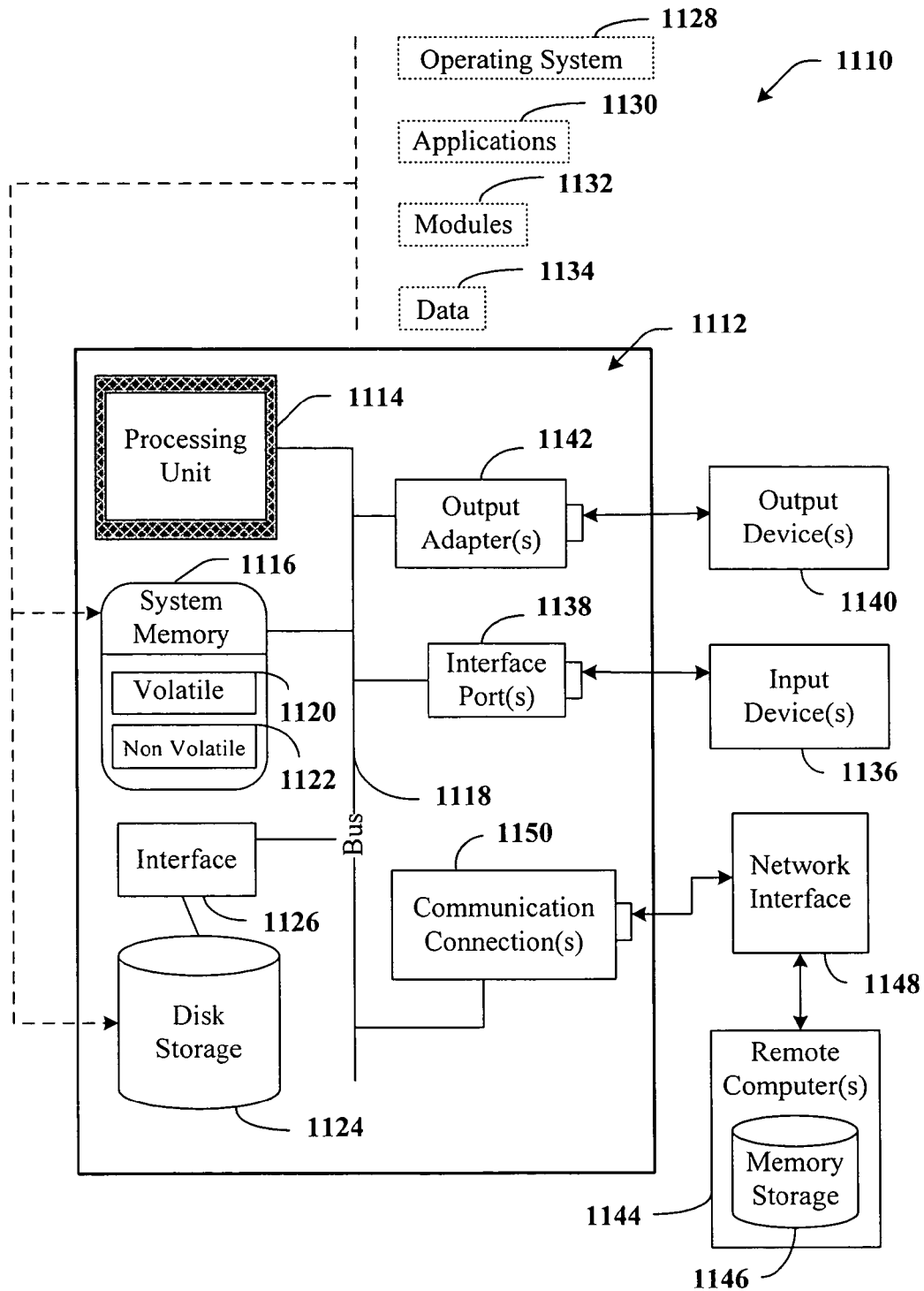
FIG. 11 is an exemplary operating environment that can be employed in connection with the subject invention.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s)

1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
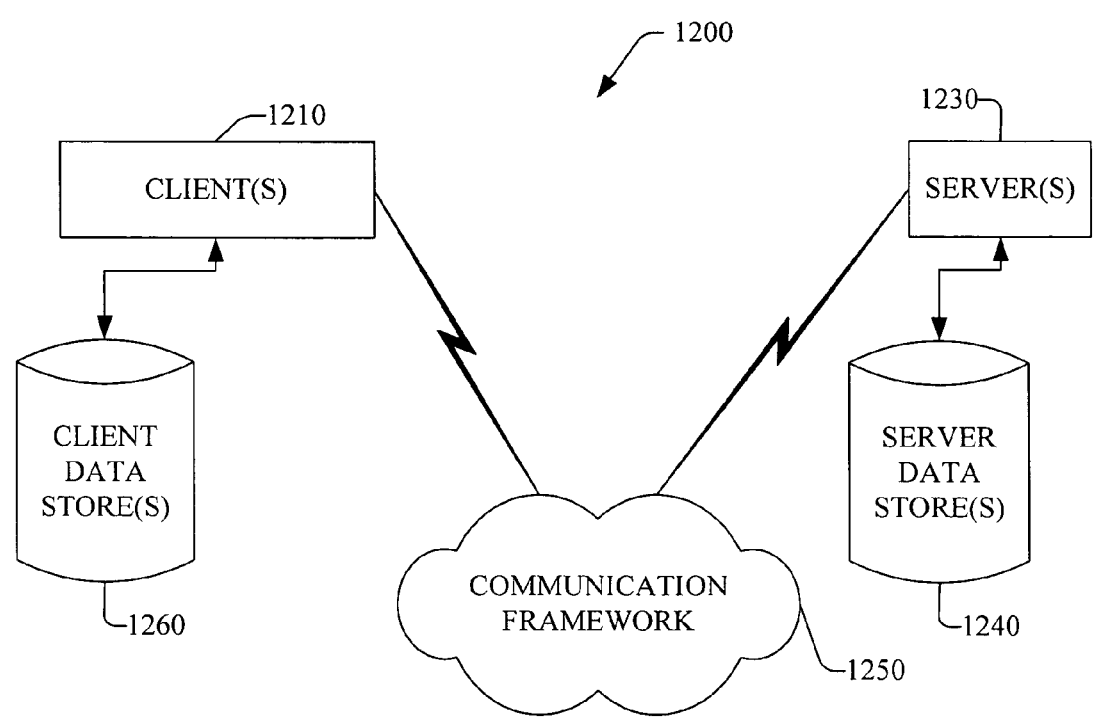
FIG. 12 is an exemplary operating environment that can be employed in connection with the subject invention.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for implementing network security, comprising:
a configuration component configured to generate a new address that identifies a first industrial device on a network and timing information defining a time at which the first industrial device is to transition to the new address, and send a first instruction that includes the new address and the timing information to the first industrial device, wherein the first instruction is configured to set a first timing component associated with the first industrial device to the time defined by the timing information, trigger a count-down based on the time defined by the timing information, and cause the first industrial device to transition from an existent address to the new address in response to expiration of the count-down; and
a second timing component configured to select the time defined by the timing information, wherein the first timing component is further configured to synchronize with the second timing component.

2. The system of claim 1, wherein the first industrial device comprises at least one of a controller, a server, a desktop computer, a laptop computer, or a personal digital assistant.

3. The system of claim 1, wherein the configuration component resides on a server.

4. The system of claim 1, wherein the configuration component resides on a client.

5. The system of claim 1, wherein the configuration component comprises at least one of a random number generator or a pseudorandom number generator, wherein the at least one of the random number generator or the pseudorandom number generator is configured to generate the new address.

6. The system of claim 5, wherein the at least one of the random number generator or the pseudorandom number generator is configured to determine the time at which the first industrial device is to transition to the new address.

7. The system of claim 6, wherein the at least one of the random number generator or the pseudorandom number generator is configured to determine the time at which the first industrial device is to transition to the new address wherein the time is within a defined range of times.

8. The system of claim 5, wherein the at least one of the random number generator or the pseudorandom number generator is configured to generate the new address, wherein the new address falls within a defined set of addresses associated with the configuration component.

9. The system of claim 1, further comprising a receiving component, associated with the first industrial device, configured to receive the first instruction and, in response to reception of the first instruction, set the first timing component to the time defined by the timing information.

10. The system of claim 9, wherein the receiving component is associated with a decryption component configured to decrypt the new address and the timing information.

11. The system of claim 9, wherein the receiving component resides on the first industrial device.

12. The system of claim 1, wherein the new address is at least one of an Internet Protocol address or a port identifier.

13. The system of claim 1, wherein the configuration component is associated with an encryption component configured to encrypt the new address and the timing information.

14. The system of claim 1, further comprising a security authority configured to verify that the first industrial device is authorized to communicate on the network.

15. The system of claim 1, wherein the configuration component resides on a router.

16. The system of claim 1, wherein the configuration component is further configured to transmit a second instruction that includes the new address and the timing information to at least one second industrial device, wherein the second instruction instructs the at least one second industrial device to employ the new address for subsequent communication with the first industrial device as of the time defined by the timing information.

17. A method for securing a network against stealth attacks, comprising:
 altering, by a system including a processor, a network address of a first industrial device at varying time intervals, the altering comprising:
  synchronizing a first timing component associated with an address authority device with a second timing component associated with the first industrial device;
  generating a new address for the first industrial device;
  determining, by the first timing component, an address change time at which to replace an existent address assigned to the first industrial device with the new address;
  communicating a first instruction that includes the new address and the address change time to the first industrial device, the first instruction initiating a count-down of the second timing component associated with the first industrial device based on the address change time; and
  replacing the existent address assigned to the first industrial device with the new address in response to expiration of the count-down.

18. The method of claim 17, wherein the determining includes selecting the address change time at least one of randomly or pseudo-randomly from a defined range of acceptable times.

19. The method of claim 17, further comprising verifying that the first industrial device is authenticated to access the network.

20. The method of claim 17, further comprising:
 encrypting the new address to yield an encrypted address;
 relaying the encrypted address to the first industrial device; and
 decrypting the encrypted address at the first industrial device.

21. The method of claim 17, further comprising instructing a second industrial device to employ the new address for communication with the first industrial device starting at the address change time via a second instruction, sent to the second industrial device, that includes the new address and the address change time.

22. A non-transitory computer-readable medium having stored thereon computer-executable components that, in response to execution, cause a processor to perform operations, the operations comprising:
 synchronizing a first clocking mechanism associated with an address authority device with a second clocking mechanism associated with an industrial device;
 associating the industrial device with a first address;
 generating a second address for the industrial device;
 specifying an address change time at which to implement an address alteration in the industrial device based on the first clocking mechanism;
 informing the industrial device of the second address and initiating a count-down of the second clocking mechanism of the industrial device based on the address change time; and
 replacing the first address with the second address in the industrial device in response to the count-down expiring.

23. The non-transitory computer-readable medium of claim 22, the operations further comprising:
 communicating the second address and the address change time to at least one other networked device; and
 employing the second address at the at least one other networked device to communicate with the industrial device beginning at or substantially at the address change time.

24. A method for protecting devices on an industrial network against unauthorized access, comprising:
 altering, by a system including a processor, a network address of an industrial device at pre-defined intervals, the altering comprising:
  synchronizing a first timing component associated with an address authority device with a second timing mechanism associated with the industrial device;
  generating a new address for the industrial device;
  determining, based on the first timing component, an address change time at which to replace an existent address assigned to the industrial device with the new address;
 communicating a first instruction that includes the new address and the address change time to the industrial device, wherein the first instruction sets the second timing component of the industrial device to the address change time and initiates a count-down of the second timing component based on the address change time; and
 replacing the existent address assigned to the industrial device with the new address in response to expiration of the count-down.

25. The method of claim 24, further comprising:
 communicating a second instruction that includes the new address and the address change time to a different industrial device on the network; and
 employing the new address in the different industrial device to identify and communicate with the industrial device at or substantially at the address change time in response to the second instruction.

* * * * *